United States Patent
Nanus

(10) Patent No.: US 9,978,080 B2
(45) Date of Patent: May 22, 2018

(54) SYSTEMS AND METHODS FOR PROVIDING EVENT REMINDER ALERTS

(71) Applicant: Rainmen USA, Inc., Norwood, NJ (US)

(72) Inventor: Jeffrey L. Nanus, Norwood, NJ (US)

(73) Assignee: RAINMEN USA, INC., Norwood, NJ (US)

( * ) Notice: Subject to any disclaimer, the term of this patent is extended or adjusted under 35 U.S.C. 154(b) by 266 days.

(21) Appl. No.: 14/593,177

(22) Filed: Jan. 9, 2015

(65) Prior Publication Data

US 2016/0203517 A1    Jul. 14, 2016

(51) Int. Cl.
*G06Q 30/02* (2012.01)
*G06Q 10/10* (2012.01)

(52) U.S. Cl.
CPC ..... *G06Q 30/0258* (2013.01); *G06Q 10/1093* (2013.01)

(58) Field of Classification Search
None
See application file for complete search history.

(56) References Cited

U.S. PATENT DOCUMENTS

| 7,080,018 B1 | 7/2006 | Fox et al. |
| 7,181,345 B2 | 2/2007 | Rosenfeld et al. |
| 8,413,884 B2 | 4/2013 | Lim et al. |
| 2002/0023230 A1* | 2/2002 | Bolnick ................. G06Q 30/02 726/28 |
| 2002/0082923 A1 | 6/2002 | Merriman et al. |
| 2007/0256716 A1* | 11/2007 | Resner .................... A45B 25/00 135/16 |
| 2011/0087550 A1 | 4/2011 | Fordyce, III et al. |
| 2013/0080251 A1* | 3/2013 | Dempski ................ G06Q 30/01 705/14.53 |
| 2014/0149213 A1 | 5/2014 | Fallatah |
| 2014/0229251 A1 | 8/2014 | Lim et al. |
| 2016/0163164 A1* | 6/2016 | Nair .................... H04M 1/7253 455/557 |

FOREIGN PATENT DOCUMENTS

| WO | 0237332 | 5/2002 |
| WO | WO-2007035514 A3 * | 4/2009 .............. G06F 8/38 |

OTHER PUBLICATIONS

Dont Forget Your Umbrella with these 5 Free Wather Apps—May 8, 2013 (Year: 2013).*

* cited by examiner

*Primary Examiner* — James M Detweiler
(74) *Attorney, Agent, or Firm* — Dilworth & Barrese, LLP.; Michael J. Musella, Esq.

(57) ABSTRACT

A system for providing reminder alerts including a host computer and a client device is disclosed. The system includes the client device for receiving a registration code associated with an item provided to a client, the item associated with a company brand of a company providing the item, transmitting the registration code from the client device to the host computer, receiving a branded alert from the host computer, and outputting the branded alert; and the host computer for registering the client device based on the registration code, determining an alert event, and transmitting to the client device the branded alert, the branded alert including information related to the alert event and information identifying the company.

14 Claims, 4 Drawing Sheets

SYSTEMS AND METHODS FOR PROVIDING EVENT REMINDER ALERTS

BACKGROUND OF THE INVENTION

This disclosure relates to a systems and methods for providing reminder alerts.

Companies spend billions of dollars on advertising every year. Advertisements in print or as video can reach a general audience, but are often not seen by current or potential clients of a company. Direct marketing can sometimes close a gap to provide advertisements to a current or potential client, but the direct marketing item is often discarded by the current or potential client as junk mail.

Many current or potential clients are users of personal electronic devices. Personal electronic devices can include cell phones, tablets, personal computers, among others, that provide the user with valuable links to data and information. These devices can provide a user with a reminder alert of an upcoming calendar event, a notification of an application update, or an alert should a local or national emergency occur. The use of these personal electronic devices to provide advertisements is grossly underdeveloped.

This disclosure describes an improvement on these prior art systems.

SUMMARY OF THE INVENTION

One embodiment of the invention is a system for providing reminder alerts. The system may include a client device for receiving a registration code associated with an item provided to a client, the item associated with a company brand of a company providing the item, transmitting the registration code from the client device to the host computer, receiving a branded alert from the host computer, and outputting the branded alert; and a host computer for registering the client device based on the registration code, determining an alert event, and transmitting to the client device the branded alert, the branded alert including information related to the alert event and information identifying the company.

Another embodiment of the invention is a system for providing reminder alerts. The system may include a host computer for receiving from a client device a registration code associated with an item provided to a client, said item associated with a company brand of a company providing the item, registering the client device based on the registration code, determining an alert event, and transmitting to the client device a branded alert, said branded alert including information related to the alert event and information identifying the company.

Yet another embodiment of the invention is a method for providing reminder alerts. The method may include receiving at the client device a registration code associated with an item provided to a client, said item associated with a company brand of a company providing the item; transmitting the registration code from the client device to the host computer; registering the client device at the host computer based on the registration code; determining by the host computer an alert event; transmitting by the host computer to the client device a branded alert, said branded alert including information related to the alert event and information identifying the company; and outputting the branded alert at the client device.

BRIEF DESCRIPTION OF THE DRAWINGS

The drawings constitute a part of the specification and include exemplary embodiments of the present invention and illustrate various objects and features thereof.

Like reference numerals indicate similar parts throughout the figures.

DETAILED DESCRIPTION OF THE PREFERRED EMBODIMENT(S)

Figure 1:
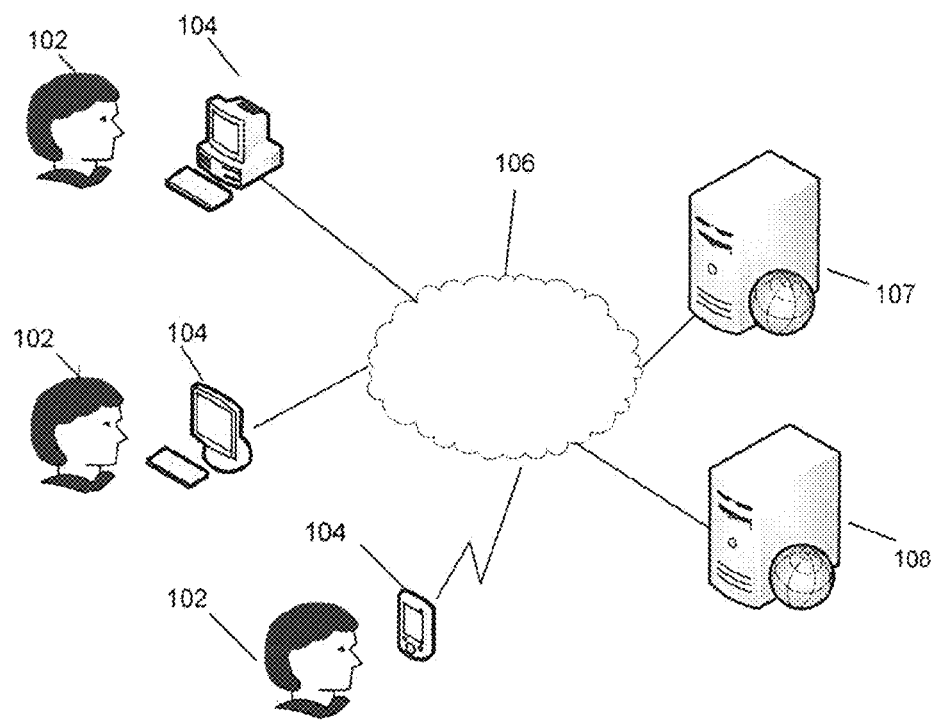
FIG. 1 is a diagram illustrating a system for providing branded event alerts to a user according to the present disclosure.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying figures.

The present disclosure solves the problems in the prior art by providing systems and methods for providing branded event alerts to a current or potential client. In the following description the system and method for providing an event alert will be described with respect to a weather alert. Although the following description is described with respect to a weather alert, it will be understood by one skilled in the art that the present disclosure can be adapted to providing alerts other than a weather alert, for example, a sporting alert (e.g., the start of a game of a favorite team) or shopping alert (e.g., a sales event at a favorite store).

In order to provide an event alert, a client is provide an item (e.g. a consumer product) by a company. The item can include company identifying information (e.g., a company logo or trademark). Each item includes a registration code (e.g., alpha-numeric coed and/or programmed into a bar code). After a user registers with the system for providing branded event alerts according to the present disclosure, the system will provide a branded event alert to the user.

An exemplary system for providing branded event alerts 100 to a current or potential client is shown in FIG. 1. System for providing branded event alerts 100 can include client devices 104, network 106, host computer 107 and event computer 108.

Client devices 104 can be used by clients 102. Client devices 104 can include cell phones, personal digital assistants (PDAs), tablets, personal computers, among others. Client devices 104 are programmable to download, install and operate a variety of applications. These applications can include games, links to e-tail stores, word processing programs, among others. In addition, client devices 104 can include cameras and applications to scan bar codes, and can access via the Internet or other network a website or other information based on the bar code. These cameras and bar code applications are well known in the art. The bar codes can also be used by client device 104 to receive programming from host computer 107 to instruct client device 104 to download and install an event alert application. User 102 can also use client device 104 to manually download from host computer 107 the event alert application.

Figure 2:
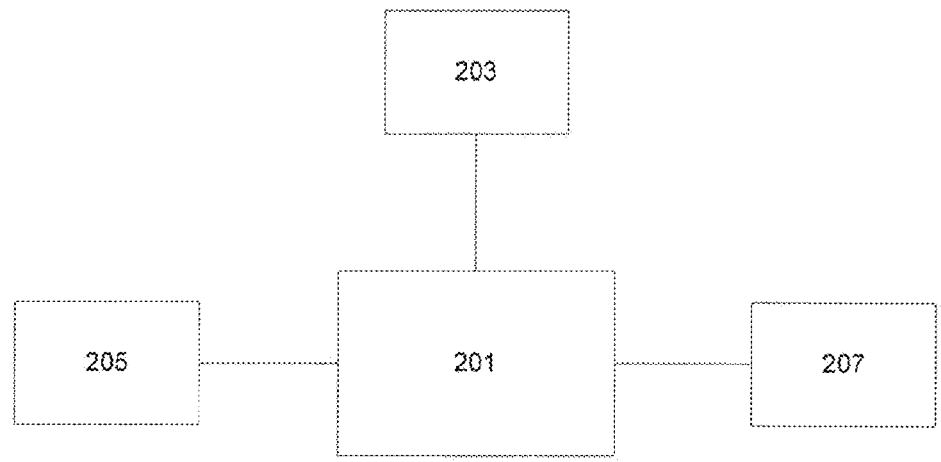
FIG. 2 is a diagram illustrating a client device for providing branded event alerts to a user according to the present disclosure.

As shown in FIG. 2, client device 104 can include a processor 201 for receiving special programming to receive and display event alerts, a memory 203 for storing programs and other operating instructions, an input device 205 (e.g., a keypad and/or a touch screen) for receiving input from client 102, and an output device 207 (e.g., a display and/or speaker) for providing event alerts and other information to client 102.

Client devices 104 can connect to network 106. Network 106 can include the Internet, a local area network (LAN), a wide area network (WAN), among others. The connections between client devices 104 and network 106 can include wired or wireless connections, for example, an Ethernet, Wifi, and/or cellular network connection, among others.

Client devices 104 can connect to host computer 107 through network 106. Host computer 107 includes programs to provide event alerts to client devices 104. Client devices 104 register with host computer 107 to receive the event alerts. Clients 102 can be provided event alert options to select to personalize the event alerts received at client devices 104, for example, host computer 107 can provide an option to set a frequency that event alerts are sent to client device 104; other options are contemplated.

Figure 3:
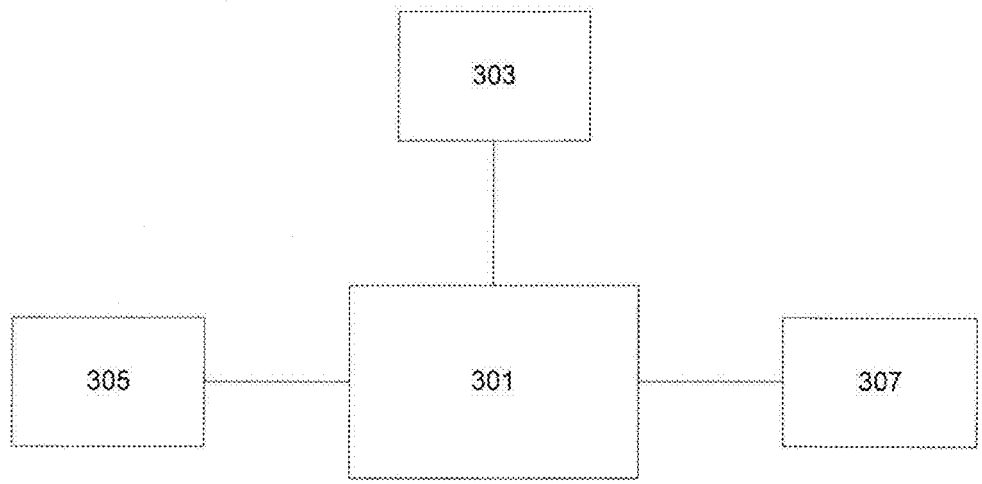
FIG. 3 is a diagram illustrating a host computer for providing branded event alerts to a user according to the present disclosure.

As shown in FIG. 3 host computer 107 can include a processor 301 for receiving special programming to register clients 102, organize events, connect with other computers including client devices 104 and event computer(s) 108, and transmit event alerts, a memory 303 for storing registered client devices 104, programs and other operating instructions, an input device 305 (e.g., a keypad and/or a touch screen) for receiving input from a host computer operator, and an output device 307 (e.g., a display and/or speaker) for providing information to the host computer operator.

Event computer 108 can also connect to network 106. Host computer 107 can connect to event computer 108 through network 106. More than one event computer 108 can be included in system 100. Event computer 108 can provide host computer 107 with events, for example, a listing of a games for a baseball team, a weather forecast for a local area, a sale at a participating store, etc. In other embodiments, events can be programmed directly into host computer 107 without the need for an event computer 108 to provide the same. The events are stored in memory 303 of host computer 107.

Figure 4:
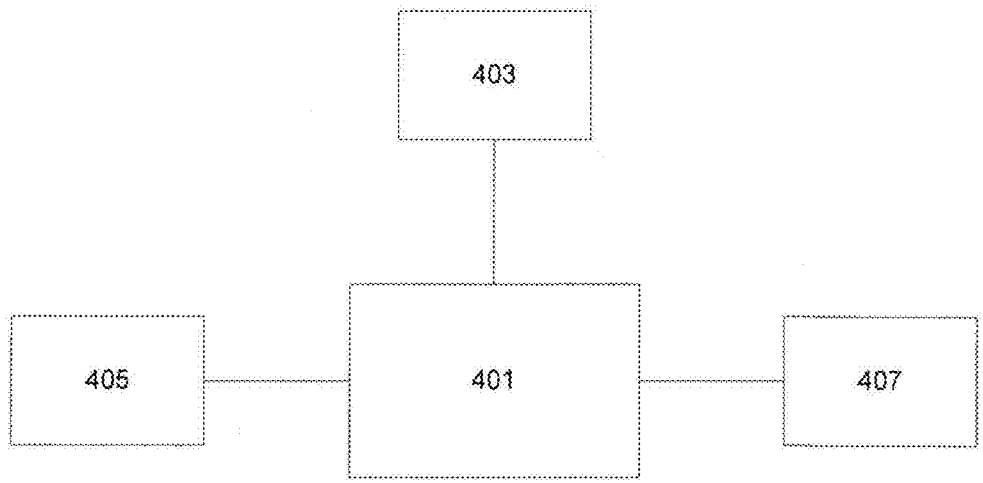
FIG. 4 is an event computer illustrating a client device for providing branded event alerts to a user according to the present disclosure.

As shown in FIG. 4 event computer 108 can include a processor 401 for receiving special programming to provide host computer 107 with events, a memory 403 for storing programs and other operating instructions, an input device 405 (e.g., a keypad and/or a touch screen) for receiving input from an event computer operator, and an output device 407 (e.g., a display and/or speaker) for providing information to the event computer operator.

Figure 5:
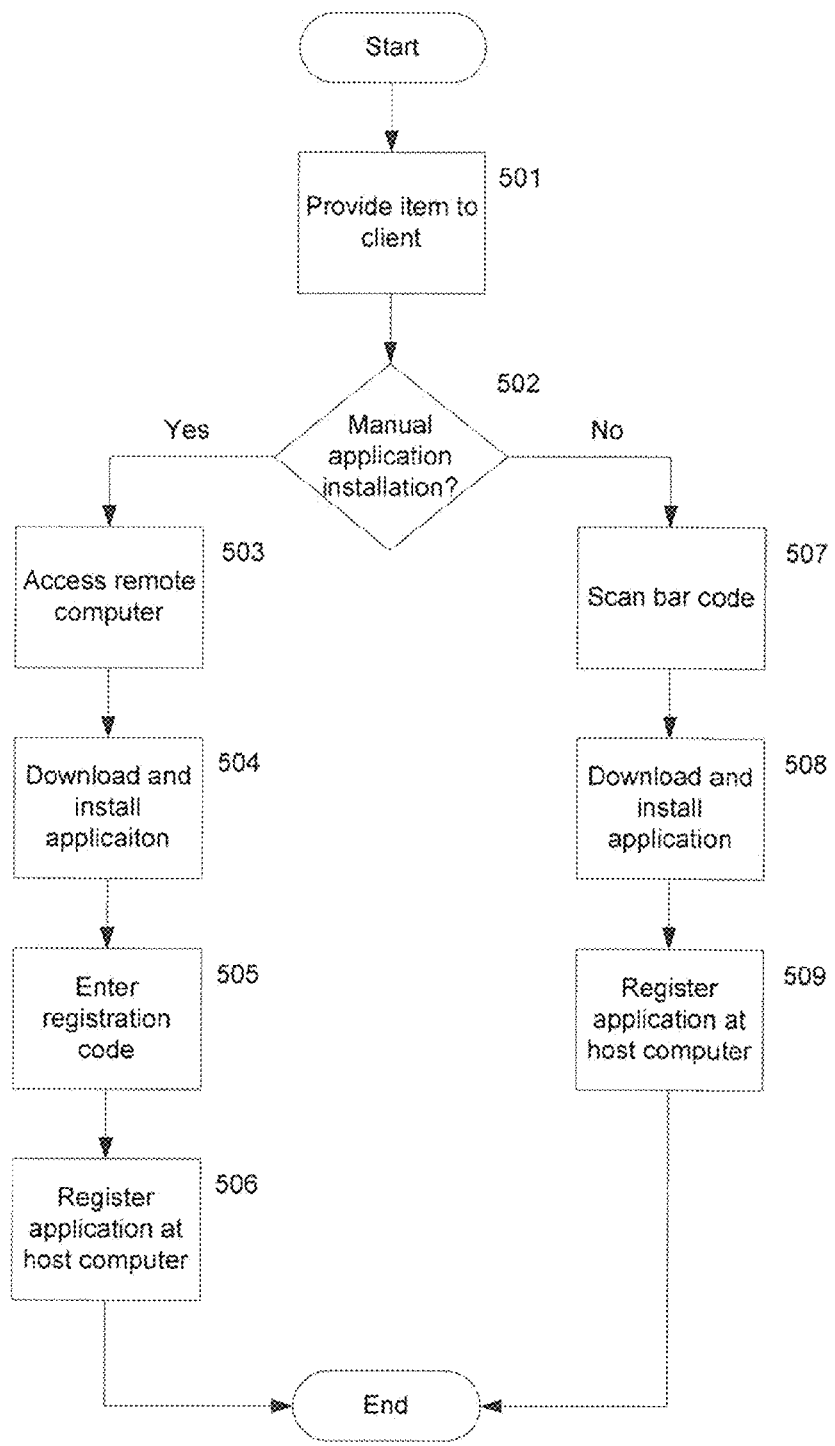
FIG. 5 is a flow chart illustrating a method for registering for branded event alerts to a user according to the present disclosure.

The operation of the system 100 according to the present disclosure will now be described with reference to FIG. 5.

In step 501 a client is provided with a branded item. The branded item includes the registration code containing the information about the item and the company providing the item. In step 502 manual or automatic installation of the application on client device 104 is determined.

The event alert application can be manually installed and registered by a user by accessing a remote computer (not shown) (e.g., iTunes, Google Play, Android store) from which the application can be downloaded. Information on how to download the application can be provided to the client with the item provided by the company.

If manual installation is to occur, in step 503 a remote computer is accessed by user using client device 104. In step 504 the reminder alert application is downloaded and installed onto client device 104.

After the application is downloaded and installed, in step 505 the application can request the client 102 to enter the registration code associated with the item and the registration code is input into client device 104 by client 102 and transmitted to host computer 107. In step 506, host computer 107 registers client device 104 into its event alert system.

The event alert application can be automatically installed and registered through the use of the scanner application discussed above. That is, the item provided to the client 102 can include a bar code. The bar code can include instructions to program client device 104 to download, install and register client device 104 with host computer 107.

If automatic installation is to occur, in step 507 client device 104 scans the bar code using the camera and bar code application and accesses the remote computer (e.g., iTunes, host computer 107) to download and install the application. The application instructs client device 104 to access host computer 104 through network 106, and in step 509 host computer 107 registers client device 104 based on the information contained in the bar code.

The registration process includes storing in memory 303 client device 104 associated with the branded item information noting that each registration code identifies the particular item provided to client 102. For example, if a branded item is an umbrella provided by Travelers insurance company, host computer 107 stores information identifying that client device 104 registered using the Travelers umbrella registration code. This information is used to provide targeted branded event alerts to specific clients, for example, a weather alert to a client who received the Travelers umbrella or a game alert to a client who received a NY Yankees baseball cap.

Figure 6:
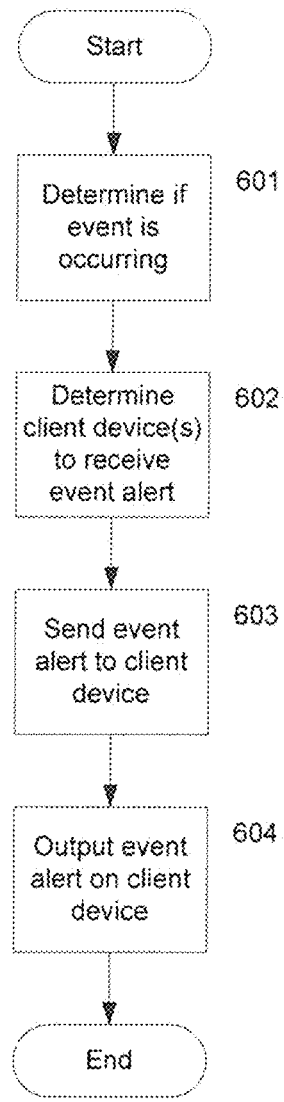
FIG. 6 is a flow chart illustrating a method for providing branded event alerts to a user according to the present disclosure.

Once a client device 104 is registered with host computer 107, host computer 107 can send targeted event alerts to client device 104. This process will be described with respect to FIG. 6.

In step 601 host computer 107 determines if an event is occurring. For example, host computer 107 may access weather information and determine the chance of rain, or host computer 107 may access upcoming game information and determine a game is to begin soon. The event information is either input into host computer 107 by the host computer operator or retrieved from event computer 108. In step 602 host computer 107 determines client device(s) 104 to receive event alerts.

Information contained in the registration code (whether alpha-numeric or bar coded) includes information about the item and the company providing the item. For example, if the item is an umbrella provided by Travelers insurance company, the registration code can include information that the item is an umbrella and provided by Travelers, or if the item is a NY Yankees baseball cap provided by the NY Yankees, the registration code can include information that the item is a baseball cap provided by the NY Yankees. This information is used to provide the correct branded alert to the client device 104.

In step 603 host computer 107 sends the event alert to client device(s) 104 registered to receive the targeted event alert. For example, if the item is the Travelers umbrella and the event is a chance of rain, host computer 107 sends client device 104 which registered the Travelers umbrella an event alert that might instruct client device 104 to display "Travelers Insurance says it looks like it might rain today, stay protected with your Travelers Insurance umbrella". The actual text and/or logo if included can be modified for different items, companies and events. In step 604, client device 104 outputs the event alert. The event alert can include one or more text, graphic, sound or any combination thereof.

The event reminder system and method can provide a company a new way to reach clients or potential clients with targeted advertising.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A system for providing branded weather alerts, the system comprising:
    an umbrella branded with a company brand of a company;
    a barcode associated with the umbrella, the barcode encoding a registration code identifying the umbrella, a network address, and instructions configured to cause a client device to access the network address to automatically download and install an event alert application onto the client device and to automatically register the client device with a host computer;
    a client device including a processor and a display, the client device configured to scan the barcode associated with the umbrella, automatically execute the instructions and access the encoded network address upon scanning of the barcode, automatically download and install the event alert application onto the client device upon scanning of the barcode, automatically transmit the registration code to the host computer upon scanning of the barcode, receive a branded weather alert from the host computer, and output via the event alert application, the branded weather alert on the display; and
    the host computer comprising a processor and memory, the host computer configured to provide the event alert application to the client device for installation thereon upon the client device accessing the network address, receive the registration code from the client device, register the client device by storing an association between the received registration code and the client device in the memory, determine a weather event, generate the branded weather alert based on the weather event, the branded weather alert including weather information and information identifying the company brand, and transmit the branded weather alert to the registered client device, wherein the branded weather alert activates the event alert application for display of the branded weather alert on the client device.

2. The system of claim 1, wherein the host computer receives the weather information from a weather forecasting service.

3. The system of claim 1, wherein the system further comprises a third party computer associated with the network address, wherein the third party computer is configured to provide the event alert application to the client device.

4. The system of claim 2, wherein the host computer is further configured to receive weather data related to a probability of rain from the weather forecasting service, compare the probability of rain with a threshold probability, determine that the probability of rain is greater than the threshold probability, and generate the branded weather alert to include a reminder to bring an umbrella responsive to the probability of rain being greater than the threshold probability.

5. The system of claim 1, wherein the branded weather alert includes at least one of graphics and text.

6. A method for providing a branded weather alert in a computer system including a host computer and a client device, comprising the steps of:
    associating a barcode with an umbrella branded with a company brand of a company, the barcode encoding a registration code identifying the umbrella, a network address, and instructions configured to cause the client device to access the network address to automatically download and install an event alert application onto the client device and to automatically register the client device with a host computer;
    scanning, by the client device, the barcode associated with the umbrella:
    automatically executing the instructions and accessing, by the client device, the encoded network address upon scanning of the barcode
    automatically downloading and installing, by the client device, the event alert application onto the client device upon scanning of the barcode,
    automatically transmitting the registration code, by the client device, to the host computer upon scanning of the barcode,
    registering the client device, by the host computer, by storing an association between the received registration code and the client device in a memory,
    determining, by the host computer, a weather event;
    generating, by the host computer, the branded weather alert based on the weather event, the branded weather alert including weather information and information identifying the company brand,
    transmitting by the host computer, the branded weather alert to the registered client device;
    the branded weather alert activating the event alert application on the client device and causing the branded weather alert to be displayed on the client device.

7. The method of claim 6, wherein the step of determining by the host computer the weather event comprises receiving by the host computer weather information from a weather forecasting service.

8. The method of claim 6, wherein a third party computer is associated with the network address, and wherein the third party computer is configured to provide the event alert application to the client device.

9. The method of claim 7, further comprising:
receiving by the host computer weather data related to a probability of rain from the weather forecasting service;
comparing the probability of rain with a threshold probability,
determining that the probability of rain is greater than the threshold probability,
and generating the branded weather alert to include a reminder to bring an umbrella responsive to the probability of rain being greater than the threshold probability.

10. The method of claim 6, wherein the branded weather alert includes at least one of graphics and text.

11. A system for providing branded weather alerts, the system including a host computer and at least one client device, comprising:
an umbrella branded with a company brand of a company;
a barcode associated with the umbrella, the barcode encoding a registration code identifying the umbrella, a network address, and instructions configured to cause a client device to access the network address to automatically download and install an event alert application onto the client device upon scanning of the barcode and to automatically register the client device with a host computer upon scanning of the barcode;
the host computer comprising a processor and memory, the host computer configured to provide the event alert application to the client device for installation thereon upon the client device accessing the network address, receive the registration code from the client device upon the client device accessing the network address, register the client device by storing an association between the received registration code and the client device in the memory, determine a weather event, generate the branded weather alert based on the weather event, the branded weather alert including weather information and information identifying the company brand, and transmit the branded weather alert to the registered client device, wherein the branded weather alert activates the event alert application for display of the branded weather alert on the client device.

12. The system of claim 11, wherein the host computer receives the weather information from a weather forecasting service.

13. The system of claim 11, wherein the system further comprises a third party computer associated with the network address, wherein the third party computer is configured to provide the event alert application to the client device.

14. The system of claim 11, wherein the host computer is further configured to receive weather data related to a probability of rain from a weather forecasting service,
compare the probability of rain with a threshold probability, determine that the probability of rain is greater than the threshold probability,
and generate the branded weather alert to include a reminder to bring an umbrella responsive to the probability of rain being greater than the threshold probability.

* * * * *